United States Patent [19]
Ishikawa

[11] Patent Number: 5,537,174
[45] Date of Patent: Jul. 16, 1996

[54] ZOOMING OPTICAL APPARATUS

[75] Inventor: Masanori Ishikawa, Yokohama, Japan

[73] Assignee: Canon Kabushiki Kaisha, Tokyo, Japan

[21] Appl. No.: 124,471

[22] Filed: Sep. 22, 1993

[30] Foreign Application Priority Data

Sep. 30, 1992 [JP] Japan .................................. 4-286852

[51] Int. Cl.$^6$ .................................................. G03B 5/00
[52] U.S. Cl. ................................... 354/195.12; 354/195.1
[58] Field of Search ............................. 354/400, 195.1, 354/195.12

[56] References Cited

U.S. PATENT DOCUMENTS

| | | | |
|---|---|---|---|
| 4,847,650 | 7/1989 | Iida et al. ........................... | 354/195.12 |
| 4,950,054 | 8/1990 | Wada et al. ........................ | 354/400 |
| 4,951,075 | 8/1990 | Takumaru et al. ................. | 354/195.1 |
| 5,027,147 | 6/1991 | Kaneda ............................... | 354/195.1 |
| 5,122,825 | 6/1992 | Tokumaru et al. ................. | 354/195.1 |
| 5,144,492 | 9/1992 | Iijima et al. ....................... | 354/195.12 |
| 5,200,860 | 4/1993 | Hirasawa et al. .................. | 354/400 |
| 5,243,372 | 9/1993 | Suzuki et al. ...................... | 354/195.12 |
| 5,270,766 | 12/1993 | Nakamura et al. ................. | 354/195.1 |
| 5,305,044 | 4/1994 | Suzuki et al. ...................... | 354/195.12 |

*Primary Examiner*—Russell E. Adams
*Attorney, Agent, or Firm*—Fitzpatrick, Cella, Harper & Scinto

[57] ABSTRACT

An optical apparatus includes a first zooming lens, a designating device for designating a zooming range, a storing circuit for storing the zooming range designated by the designating device, and a driving control device for zooming the first lens within the zooming range stored in the storing circuit.

17 Claims, 11 Drawing Sheets

ZOOMING OPTICAL APPARATUS

BACKGROUND OF THE INVENTION

1. Field of the Invention

The present invention relates to an optical apparatus for controlling the movement of a zoom lens.

2. Description of the Related Art

Hitherto, zoom lenses (hereinafter referred to as a constant magnification zoom) have been proposed, having a driving means (hereinafter also referred to as an actuator) for electrically driving a zoom lens when the driving means detects that a photographer is operating an operation member, or for concurrently detecting the position of a focusing lens with an autofocus mechanism to automatically drive a zoom lens so that a constant photographic magnification is attained. Also, various zoom optical systems having a focusing function for focusing on a close object, i.e., a so-called macro function, provided use optical elements other than a focusing lens, have already been designed.

Of such zoom optical systems, when a macro function starting from an end point of a zooming range of a magnification or compensation lens is used, a macro focus function can be made integral with the zoom mechanism (e.g., an arrangement in which a cam curve for the closest photographic area is formed on the extension line of the cam curve in the zoom photographic area of a cam member for controlling the movement of the optical system for varying the zoom lens barrel). Therefore, it is possible to prevent the mechanical arrangement from becoming complex and to easily change from a zooming to a macro photographing mode.

However, in the example of the prior art, when an object to be autofocused comes extremely close or moves farther away after the magnification has been determined in a constant magnification zoom mode or the like, an unnatural photograph is obtained because the zooming lens is driven to a wide-angle/telephoto side according to the distance of the object so as to attain a constant magnification. Depending upon the brightness of the object, since the lens is driven to the telephoto position as the object moves away, the lens position may go beyond the camera shake limit or the illuminating angle of the strobe. In the recent trend for higher zoom ratios, the higher the magnification of the zooming lens, the greater the tendency to go beyond these limits.

Regarding macro-photographing, when a camera lens capable of photographing at the closest distance is applied to the autofocus (AF) lens, since only an actuator for driving a focusing lens is installed in an AF lens, the member for operating the zooming lens must be manually operated in the macro area in order to perform focusing, though AF is possible in an ordinary photographic area. Hence, complete AF cannot be attained.

Recently, an arrangement has been proposed in which an actuator for driving a zooming lens is installed, and the zooming lens is moved automatically to a desired focal length, or the movement of the focusing lens is detected and a constant magnification is attained. However, there is the problem that the actuator only controls the focal length when driving the zooming lens.

SUMMARY OF THE INVENTION

An object of the present invention is to solve the above-mentioned problem.

To achieve that object according to one aspect of the present invention, there is provided an optical apparatus including designating means for designating a zooming range; storing means for storing a designated zooming range; and control means for allowing a zooming lens to move in a stored zooming range, thus making it possible to take natural photographs.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Preferred embodiments of the present invention will be explained below with reference to the accompanying drawings.

First Embodiment

Figure 1:
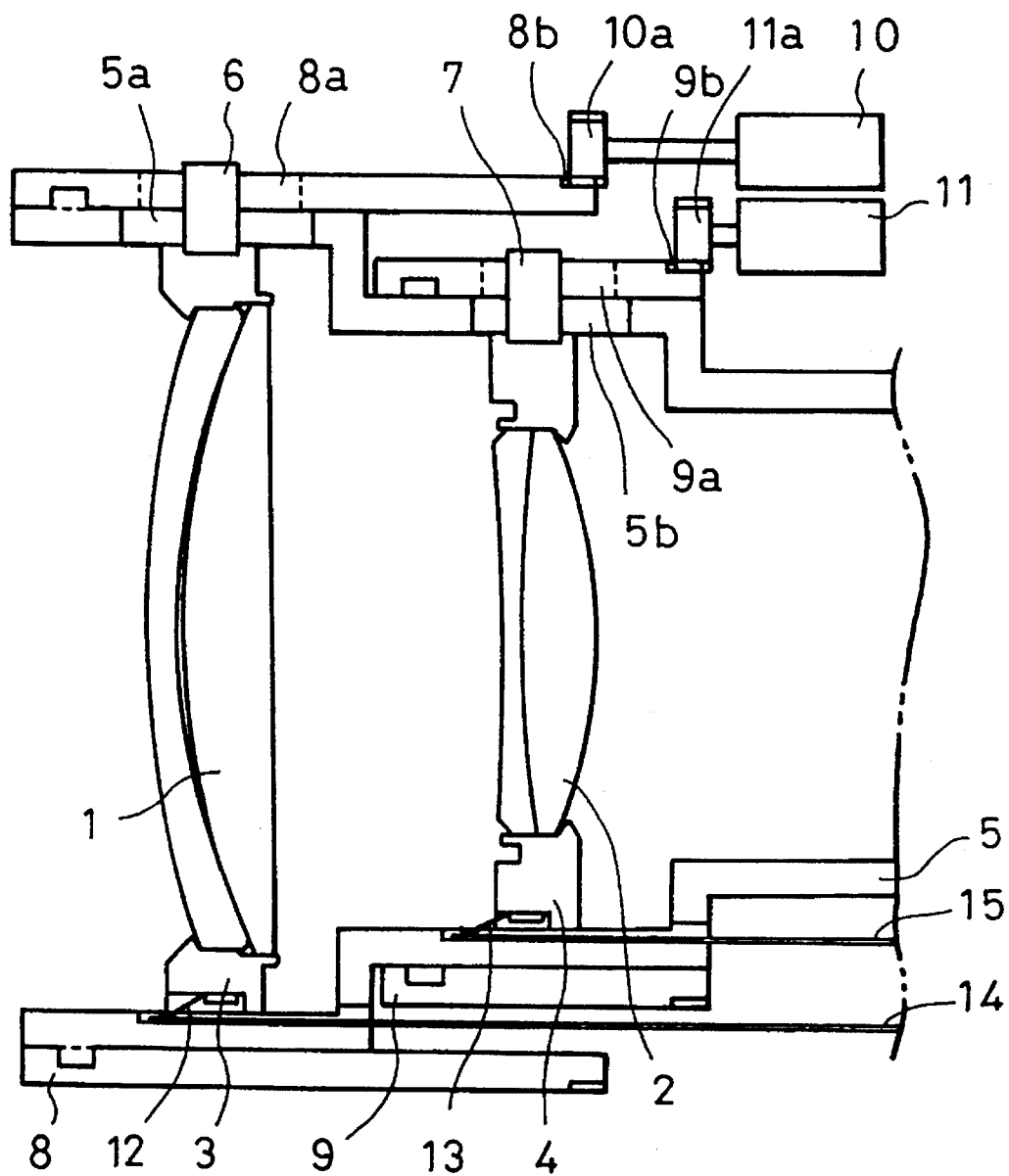
FIG. 1 is a longitudinal sectional view of a zoom lens in accordance with a first embodiment of the present invention.

FIG. 1 is a longitudinal sectional view of a zoom lens in accordance with the first embodiment of the present invention. Referring to FIG. 1, reference numeral 1 denotes a focusing lens; reference numeral 2 denotes a zooming lens; reference numeral 3 denotes a first barrel for holding the focusing lens 1; reference numeral 4 denotes a second barrel for holding the zooming lens 2; reference numeral 5 denotes a guide barrel for holding the first barrel 3 and the second barrel 4 so that these barrels move straight along the optical axis; reference numeral 6 denotes a roller, integrally fixed to the first barrel 3, which roller engages with a straight groove 5a of the guide barrel 5 and a cam groove 8a of a cam ring to be described later; reference numeral 7 denotes a roller, integrally fixed to the second barrel 4, which roller engages with a straight groove 5b of the guide barrel 5 and a cam groove 9a of a cam ring to be described later.

Reference numeral 8 denotes a cam ring which is rotatably engaged with and held outside the guide barrel 5. The cam ring 8 is provided with the cam groove 8a with which the roller 6 engages, and a gear 8b which engages with a pinion 10a of a focusing motor to be described later. Reference numeral 9 denotes a cam ring which is rotatably engaged with and held by the guide barrel 5, the cam ring being provided with the cam groove 9a of the cam ring 9 with which the roller 7 engages, and a gear 9b which engages with a pinion of a zooming motor to be described later.

Reference numeral 10 denotes a focusing motor having a pinion 10a which engages with the gear 8b of the cam ring 8; reference numeral 11 denotes a zooming motor having a pinion 11a which engages with the gear 9b of the cam ring 9; reference numeral 12 denotes a focusing detecting brush which is integrally fixed to the first barrel 3; reference numeral 13 denotes a zooming detecting brush which is integrally fixed to the second barrel 4; reference numeral 14 denotes a printed board having a gray code pattern, arranged on the large-diameter inner surface for the guide barrel 5, on which board the focusing detecting brush 12 slides; and reference numeral 15 denotes a printed board having a gray code pattern, arranged on the small-diameter inner surface of the guide barrel 5, on which board the zooming detecting brush 13 slides.

Next, the operation of the present invention will be explained. The focusing motor 10 is driven during focusing. When the cam ring 8 is rotated, the first barrel 3 moves straight along the optical axis, and the position thereof is detected by the focusing detecting brush 12 and the printed board 14. In contrast, the zooming motor 11 is driven during zooming. When the cam ring 9 is rotated, the second barrel 4 moves straight along the optical axis, and the position thereof is detected by the zooming detecting brush 13 and the printed board 15.

Figure 2:
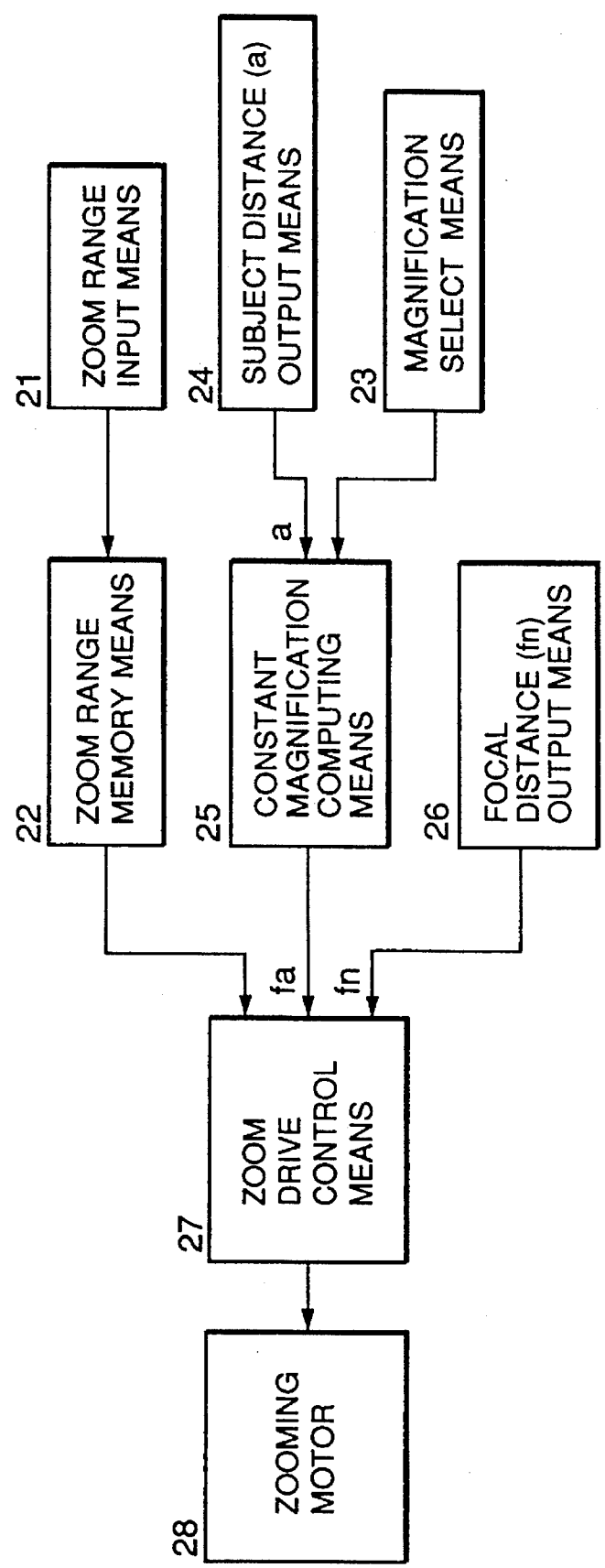
FIG. 2 is block diagram illustrating an electrical system of the first embodiment of the present invention.

FIG. 2 is block diagram illustrating an electrical system of the first embodiment of the present invention. Referring to FIG. 2, reference numeral 21 denotes a zoom range input means through which a photographer inputs a wide-angle limit fW' or a telephoto limit ft', or both; reference numeral 22 denotes storing means for storing a zoom range input from the input means 21; reference numeral 23 denotes a magnification select switch SW operated by a photographer to set a desired magnification β; reference numeral 24 denotes means for outputting an object distance "a" detected by the focusing detecting brush 12; reference numeral 25 denotes a constant magnification computing means for computing a focal length "fa" for achieving a desired magnification selected on the basis of the magnification β input from the magnification select switch SW 23 and the object distance "a"; and reference numeral 26 denotes means for outputting a current focal length "fn" detected by the zooming detecting brush 13.

Reference numeral 27 denotes a zoom drive control means. This controls the zooming motor 11 on the basis of zoom range information from the storing means 22, the focal length "fa" for achieving a desired magnification from the constant magnification computing means 25, and the current focal length "fn" output from the output means 26.

Figure 3:
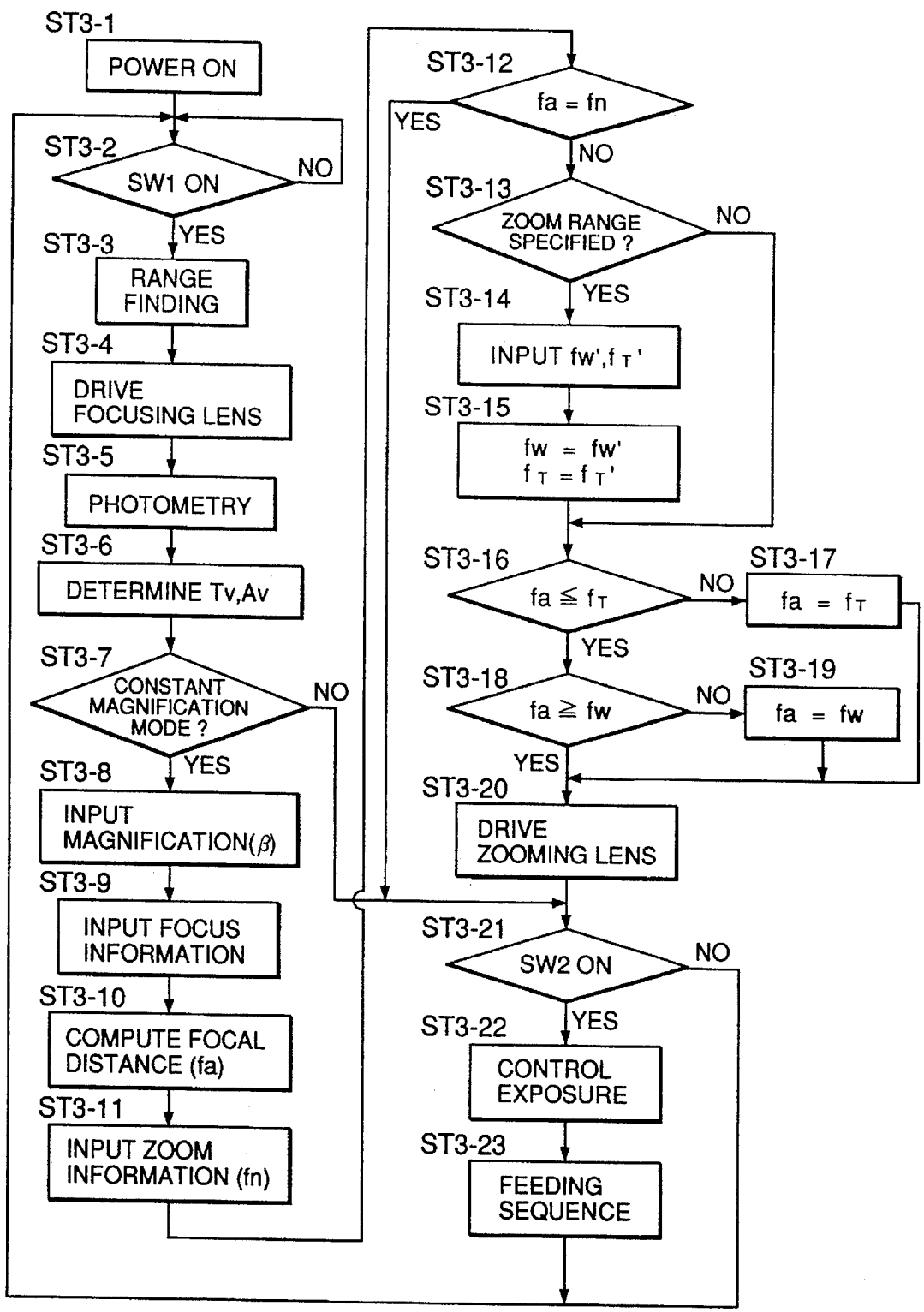
FIG. 3 is a flowchart showing the operation of the first embodiment of the present invention.

The operation of the first embodiment of the present invention will be explained below with reference to the flowchart in FIG. 3. In step ST3-1, the power supply is turned on for initialization. The operation is performed in the order of steps described below.

If SW1 is on in step ST3-2, the process proceeds to step ST3-3; if it is off, the process returns to step ST3-2. In step ST3-3, the focus of the object is detected (focusing), and an amount of defocus is detected.

In step ST3-4, the focusing lens is driven on the basis of the amount of defocus detected in step ST3-3. Then, the brightness of the object is photometered in step ST3-5.

In step ST3-6, a shutter value Tv and an aperture value Av are determined on the basis of the photometered value. In step ST3-7, a determination is made whether a constant magnification mode has been selected. When a constant magnification mode has been selected, the process proceeds to step ST3-8; when a constant magnification mode has not been selected, the process proceeds to step ST3-21.

In step ST3-8, the selected magnification β is input, and in step ST3-9, the object distance "a" is input from the focusing detecting brush 12 (encoder). In step ST3-10, the desired focal length "fa" is computed on the basis of the selected magnification β and the object distance "a" and then in step ST3-11, the current focal length "fn" is input from the zooming detecting brush 13 (encoder).

In step ST3-12, the computed, desired focal length "fa" is compared with the current focal length "fn". When "fa" is equal to "fn", the process proceeds to step ST3-21; when "fa" is not equal to "fn", the process proceeds to step ST3-13 where it is determined whether the zoom range has been designated. When the zoom range has been designated, the process proceeds to step ST3-14; when it has not been designated, the process proceeds to step ST3-16.

In step ST3-14, the designated wide-angle end fw' and the designated telephoto end fT' are input, and in step ST3-15, fw' and fT' are respectively substituted for actual wide-angle end fw and telephoto end "fT". In step ST3-16, the desired focal length "fa" is compared with the telephoto end ft'. When "fa"<"fT", the process proceeds to step ST3-18; when "fa">"fT", the process proceeds to step ST3-17.

In step ST3-17, "fT" is substituted for the desired focal length "fa". In step ST3-18, the desired focal length "fa" is compared with the wide-angle end "fw". When "fa"≧"fw", the process proceeds to step ST3-20; when "fa"<"fw", the process proceeds to step ST3-19. In step ST3-19, the wide-angle end "fw" is substituted for the desired focal length "fa". In step ST3-20, the lens is driven until the focal length becomes the desired focal length "fa".

In step ST3-21, when SW2 is on, the process proceeds to step ST3-22; when SW2 is off, the process returns to step ST3-2. In step ST3-22, exposure is controlled on the basis of the shutter value Tv and the aperture value Av determined in step ST3-6 and then the process proceeds to the feeding sequence of step ST3-23 where the film is wound up. After the film is completely wound up, the process returns to step ST3-2.

Second Embodiment

Figure 4:
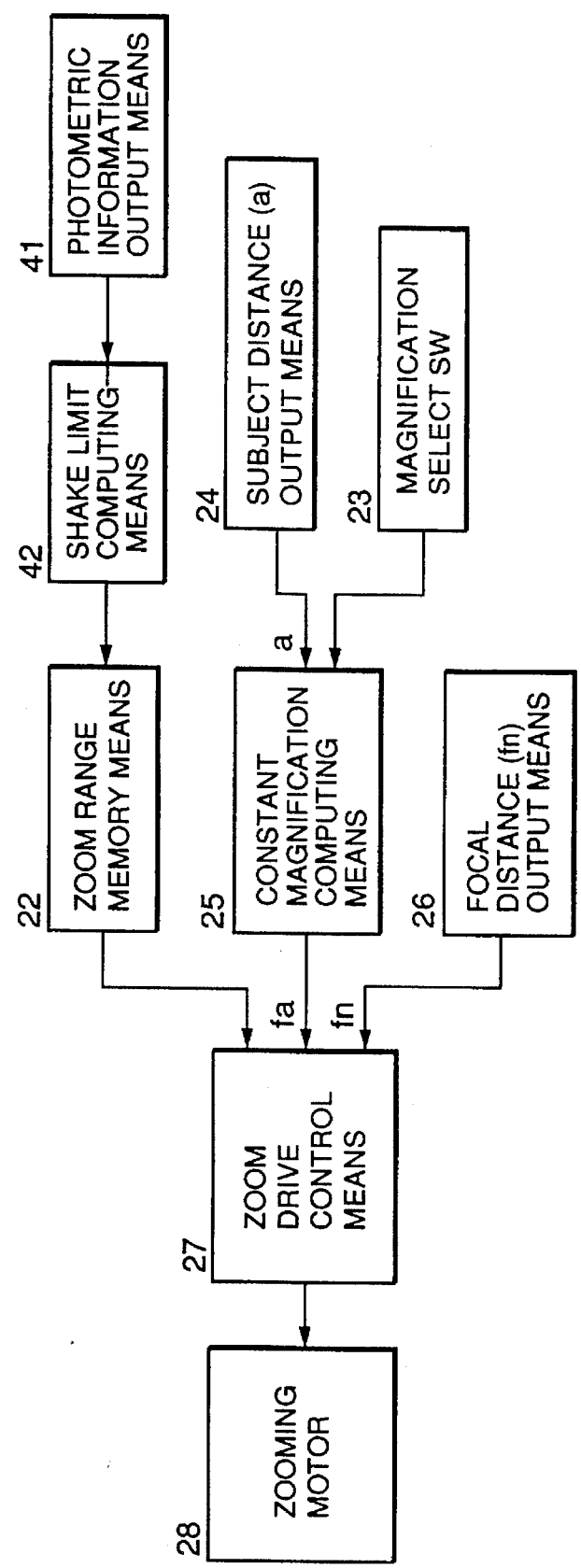
FIG. 4 is a block diagram illustrating an electrical system of a second embodiment of the present invention.

FIG. 4 is a circuit block diagram illustrating the second embodiment of the present invention. Referring to FIG. 4, reference numeral 41 denotes photometric information output means for photometering the brightness of an object and outputting a photometered value; and reference numeral 42 denotes camera shake limit computing means for computing a focal length "fT'", which is a camera shake limit, on the basis of the output photometric value. The second embodiment is the same as the first embodiment shown in FIG. 2 except that the camera shake limit focal length "fT'" computed by the shake limit computing means 42 is input to the zoom range storing means 22 as a telephoto-side focal length. Therefore, the components in the second embodiment which are the same as those in the first embodiment are given the same reference numerals, and an explanation thereof is omitted.

Figure 5:
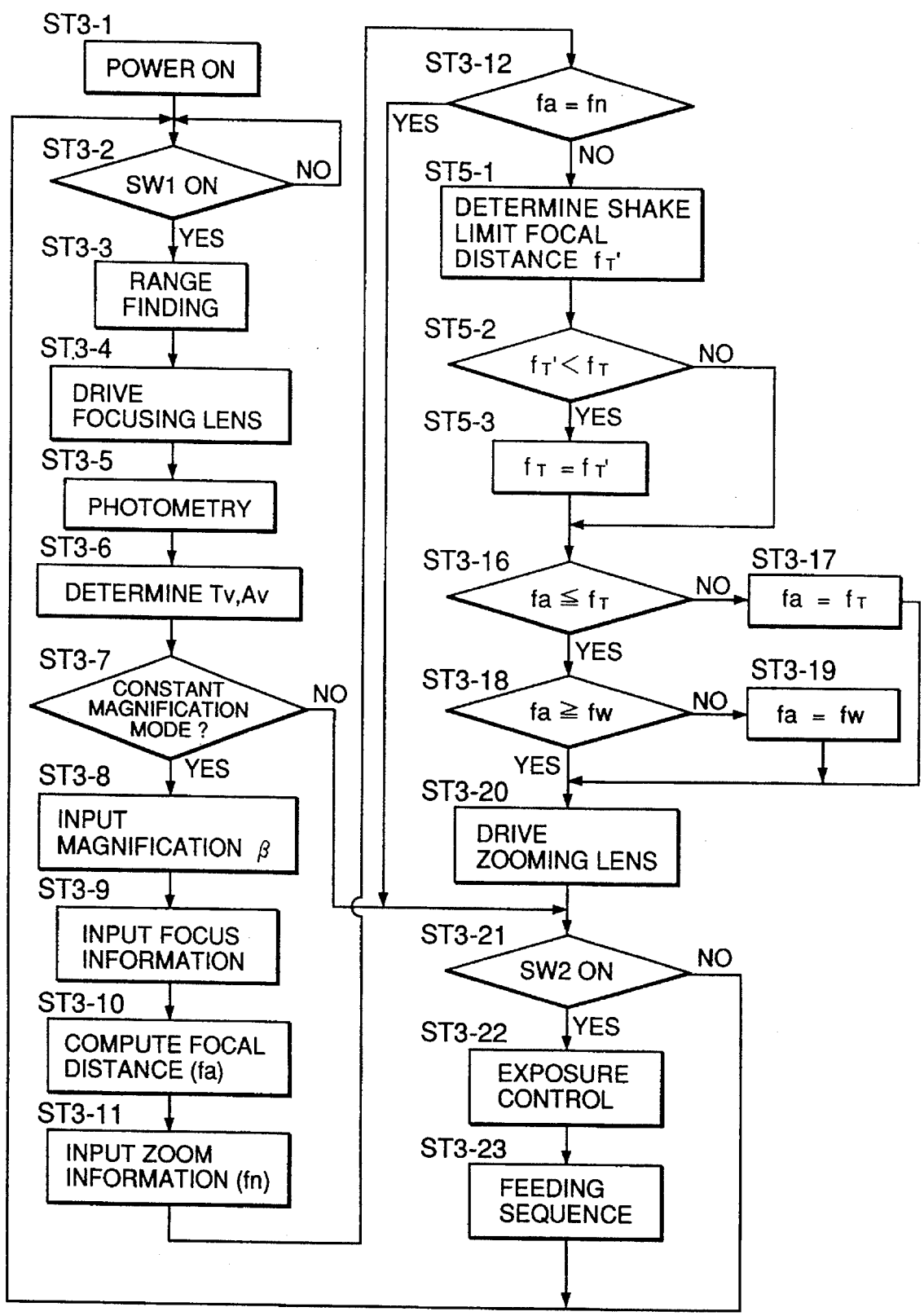
FIG. 5 is a flowchart showing the operation of the second embodiment of the present invention.

The operation of the second embodiment of the present invention will be explained below with reference to the flowchart in FIG. 5. Since the operation from step ST3-1 to ST3-12 is the same as in the first embodiment, an explanation thereof is omitted. In step ST5-1, the focal length "fT'", which is a camera shake limit, is computed on the basis of the value photometered in step ST3-5.

In step ST5-2, the camera shake limit focal length "fT'" is compared with the actual telephoto end "fT". When "fT'"<"fT", the process proceeds to step ST5-3; when "fT'"≧"fT", the process proceeds to step ST3-16. After "fT'" is substituted for the telephoto end "fT" in step ST5-3, the operation from step ST3-16 to ST3-23 is performed as in the first embodiment. Thus, an explanation thereof is omitted here for the sake of convenience.

Third Embodiment

Figure 6:
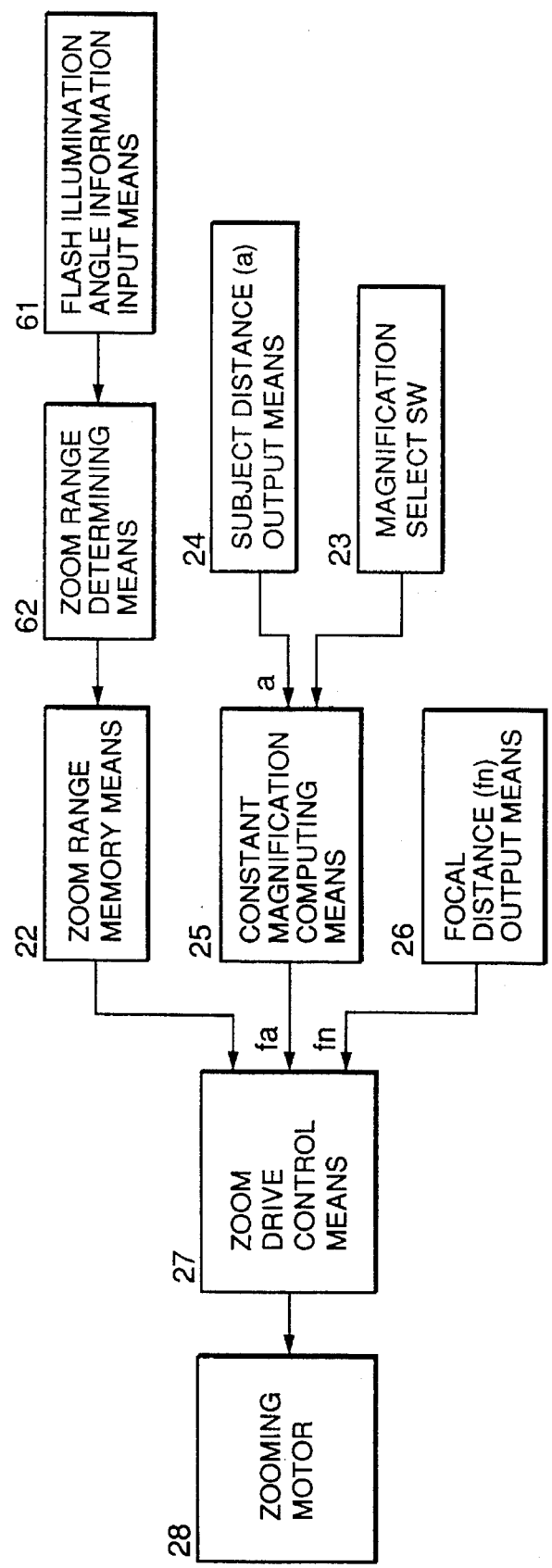
FIG. 6 is a block diagram illustrating an electrical system of a third embodiment of the present invention.

FIG. 6 is a circuit block diagram illustrating the third embodiment of the present invention. Referring to FIG. 6, reference numeral 61 denotes a strobe illuminating angle information input means for inputting information on the range of the variable illuminating angle of a strobe from an unillustrated strobe through a camera body; and reference numeral 62 denotes zoom range determining means for determining the focal length of the lens corresponding to the illuminating angle information of the strobe on the basis of the information on the range of the input variable illuminating angle of the strobe. The operation of the third embodiment is the same as that of the first embodiment shown in FIG. 2 except that a focal length corresponding to the illuminating angle information of the strobe, determined by the range determining means 62, is input to the storing means 22 for storing a zoom range. Therefore, components in the third embodiment which are the same as in the first embodiment are given the same reference numerals and an explanation thereof is omitted.

Figure 7:
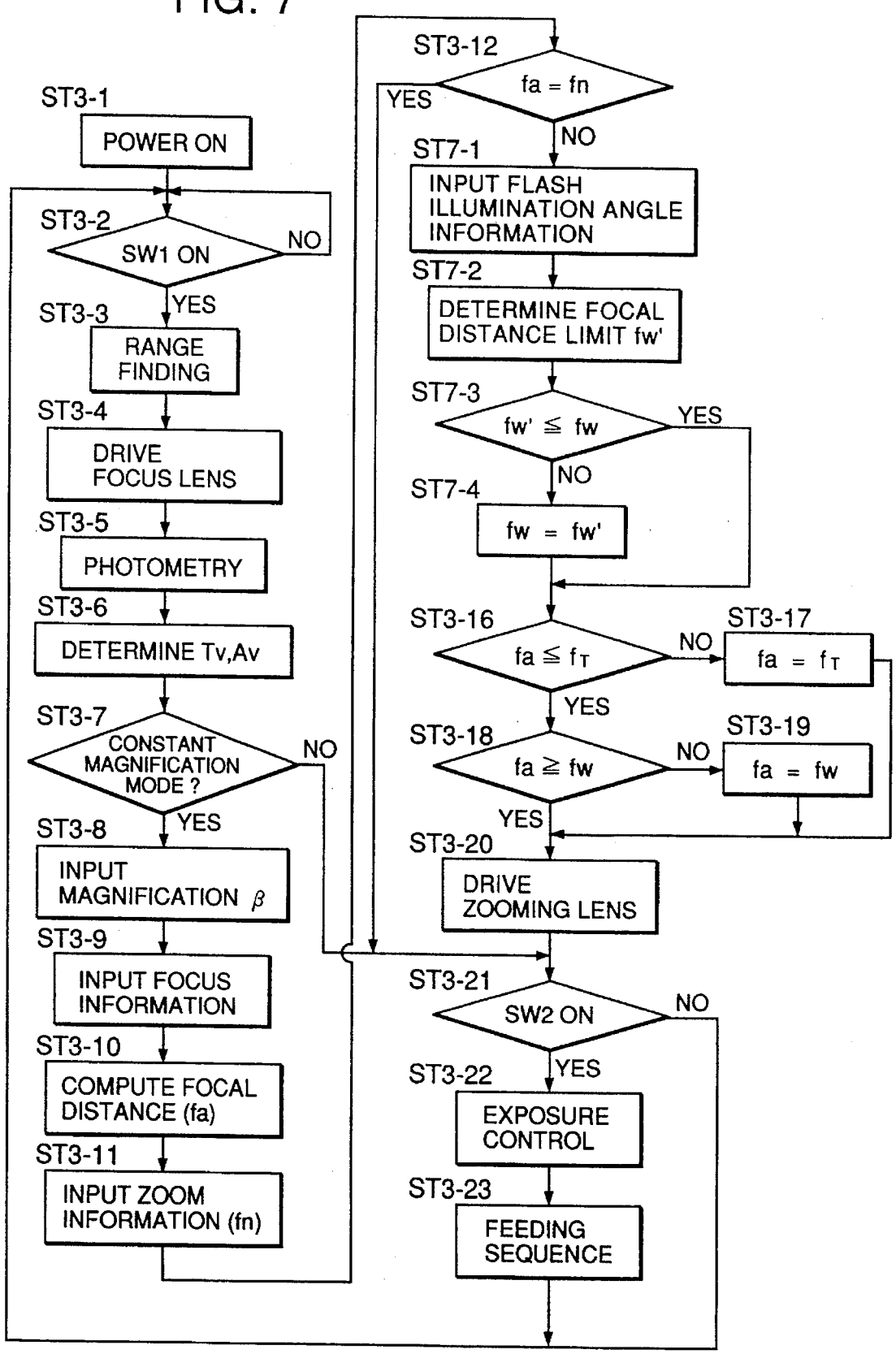
FIG. 7 is a flowchart showing the operation of the third embodiment of the present invention.

The operation of the third embodiment of the present invention will be explained below with reference to the flowchart in FIG. 7.

The operation from step ST3-1 to ST3-12 is the same as in the first embodiment, and thus an explanation thereof is omitted here. In step ST7-1, information on the range of the variable illuminating angle of the strobe is input. In step ST7-2, the focal length limit "fW'" of the wide-angle side which corresponds to the information on the range of the variable illuminating angle of the strobe is determined.

In step ST7-3, the focal length limit "fW'" of the wide-angle side is compared with the actual wide-angle end "fw". When "fW'" is ≦"fw", the process returns to step ST3-16; when "fW'" is >"fw", the process proceeds to step ST7-4 In this step ST7-4, "fW'" is substituted for the wide-angle end "fw". Then, the operation from step ST3-16 to ST3-23, which is the same as in the first embodiment, is performed. An explanation of this operation is omitted here for the sake of convenience.

Fourth Embodiment

Figure 8:
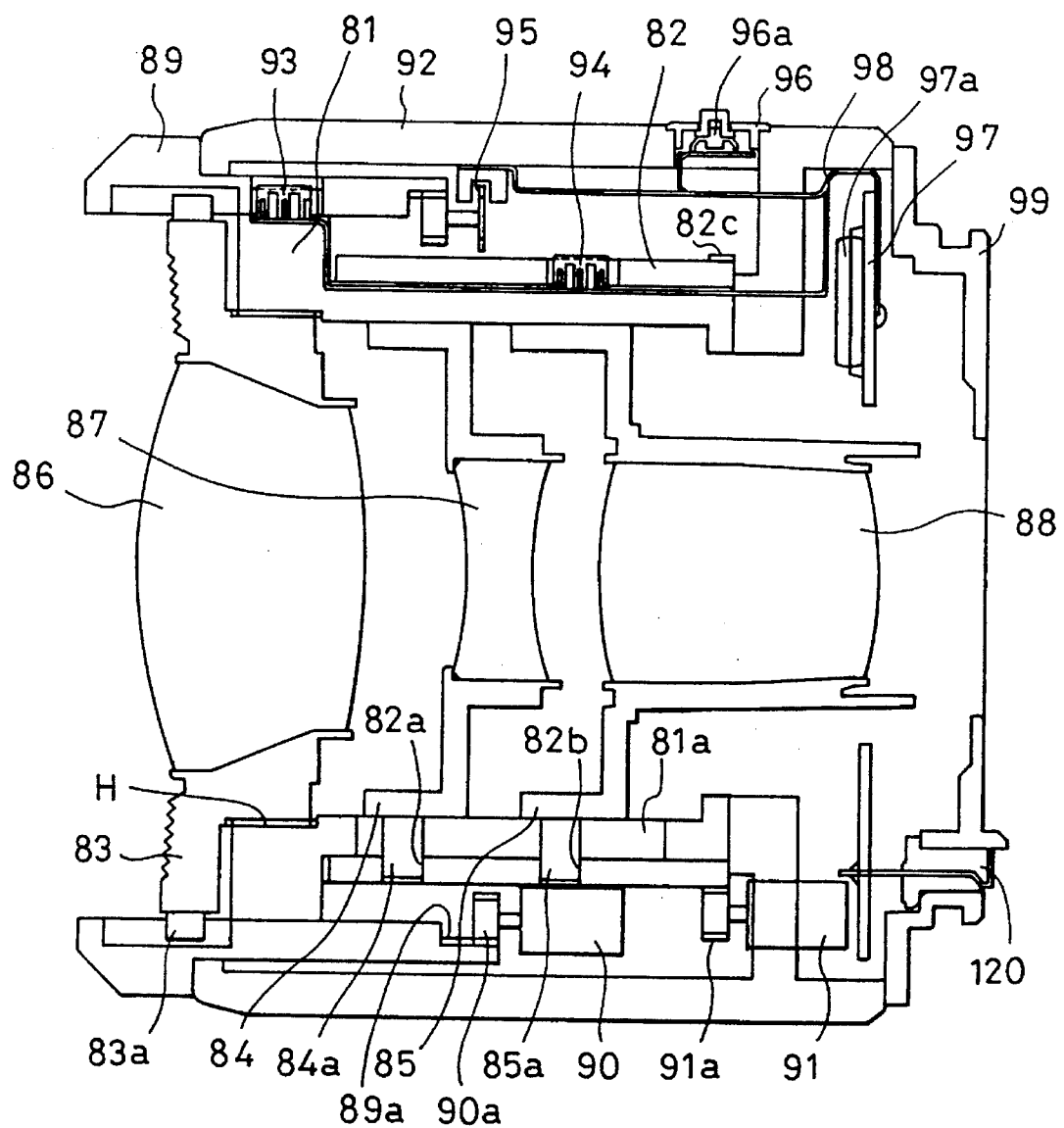
FIG. 8 is a longitudinal sectional view of a zoom optical system in accordance with a fourth embodiment of the present invention.

FIG. 8 is a longitudinal sectional view of a zoom optical system in accordance with the fourth embodiment of the present invention. Referring to FIG. 8, reference numeral 81 denotes a fixed barrel provided with a straight groove; reference numeral 82 denotes a cam ring, for zooming, which is held rotatable in the fixed barrel 81; reference numeral 83 denotes a first group lens barrel, which is helicoid (H) coupled to the fixed barrel 81, for holding a first group lens 86 for focusing; and reference numerals 84 and 85 denote second and third group lens barrels for holding a second group lens 87 for zooming and a third group lens 88, respectively. The second and third group lens barrels 84 and 85 are moved straight along the optical axis via pins 84a and 85a by means of a straight groove 81a of the fixed barrel 81 and cams 82a and 82b of the cam ring 82 for zooming.

Reference numeral 89 denotes a focus ring rotatably held in the fixed barrel 81; reference numeral 90 denotes a focusing motor, provided with a pinion 90a which engages with a gear 89a formed on the inner surface of the focus ring 89, for performing focusing by rotating the focus ring 89; and reference numeral 91 denotes a zooming motor, provided with a pinion 91a which engages with a gear 82c formed on the outer surface of the cam ring 82 for zooming, for performing zooming by rotating the cam ring 82 for zooming.

Reference numeral 92 denotes a sheathing ring fixed to the fixed barrel 81; reference numeral 93 denotes focus absolute position detecting means for detecting the absolute focus position on the basis of the relationship between the fixed barrel 81 and the focus ring 89 as a result of the rotation of the focus ring 89, which detecting means is specifically formed of an armature and a pattern board; reference numeral 94 denotes zoom position detecting means for roughly detecting the zoom position on the basis of the relationship between the fixed barrel 81 and the cam ring 82 for zooming as a result of the rotation of the cam ring 82, which zoom position detecting means is specifically formed of an armature and a pattern board.

Reference numeral 95 denotes an encoder for incrementally generating pulses by the rotation of the focus ring 89; reference numeral 96 denotes a switch panel formed on the sheathing ring 92, on which switch panel a macro select SW 96a for allowing an operator to make a selection whether or not the lens is moved into a macro zone is arranged.

Reference numeral 97 denotes a main circuit board which is electrically connected to the position detecting means 93 and 94, the encoder 95, and the macro select SW 96a via a flexible board 98 by means of unillustrated lead wires, and also electrically connected to an electrical contact point 120, a microcomputer 97a for electrically controlling lenses and circuits being installed on the main circuit board 97; reference numeral 99 denotes a mount which is fixed to the sheathing ring 92 and mechanically connected to the unillustrated camera body. The electrical contact point 120 is electrically connected to the unillustrated camera body.

Figure 9:
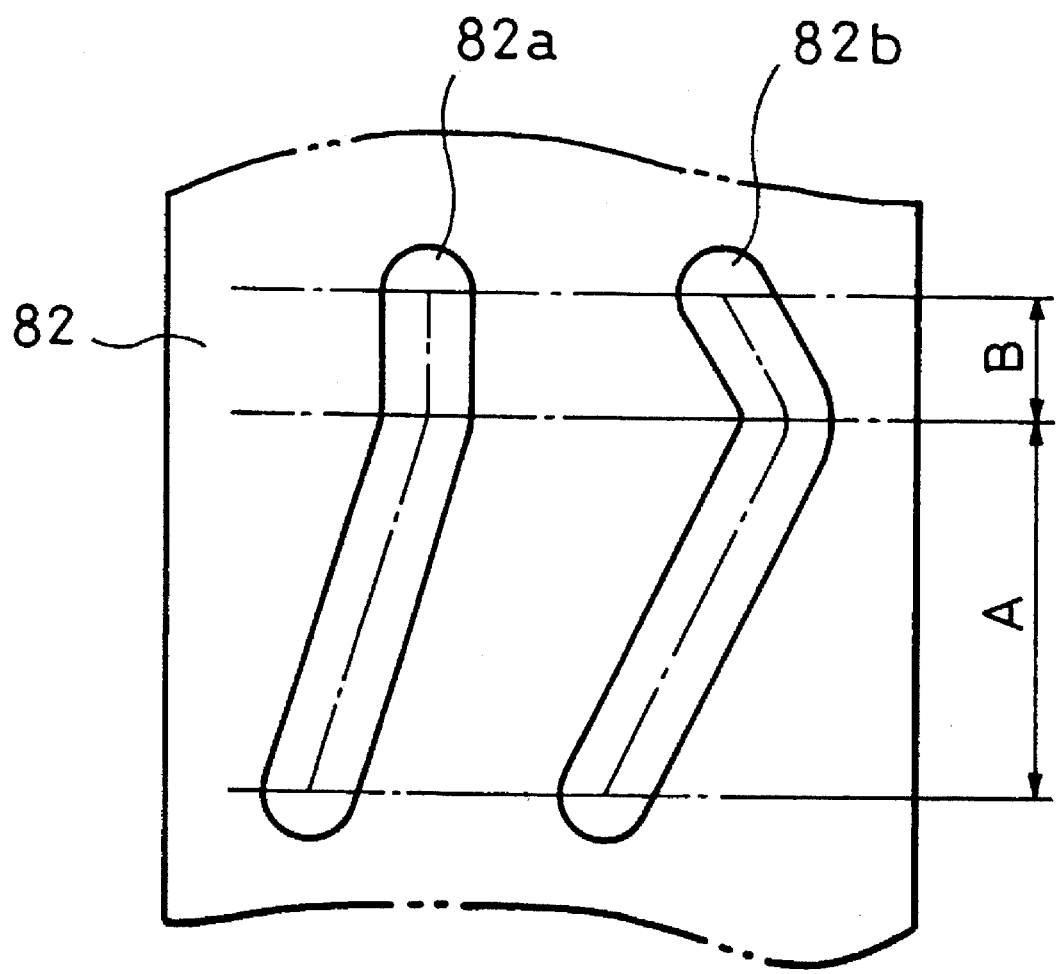
FIG. 9 is a development of a cam ring in the fourth embodiment of the present invention.

FIG. 9 is a development view illustrating cams 82a and 82b of the cam ring 82. The reference numeral 82a indicates a cam for the second group lens, and the reference numeral 82b indicates a cam for the the third group lens. The range A indicates a cam region for normal zooming, and the range B indicates a cam region for macro photographing.

Figure 10:
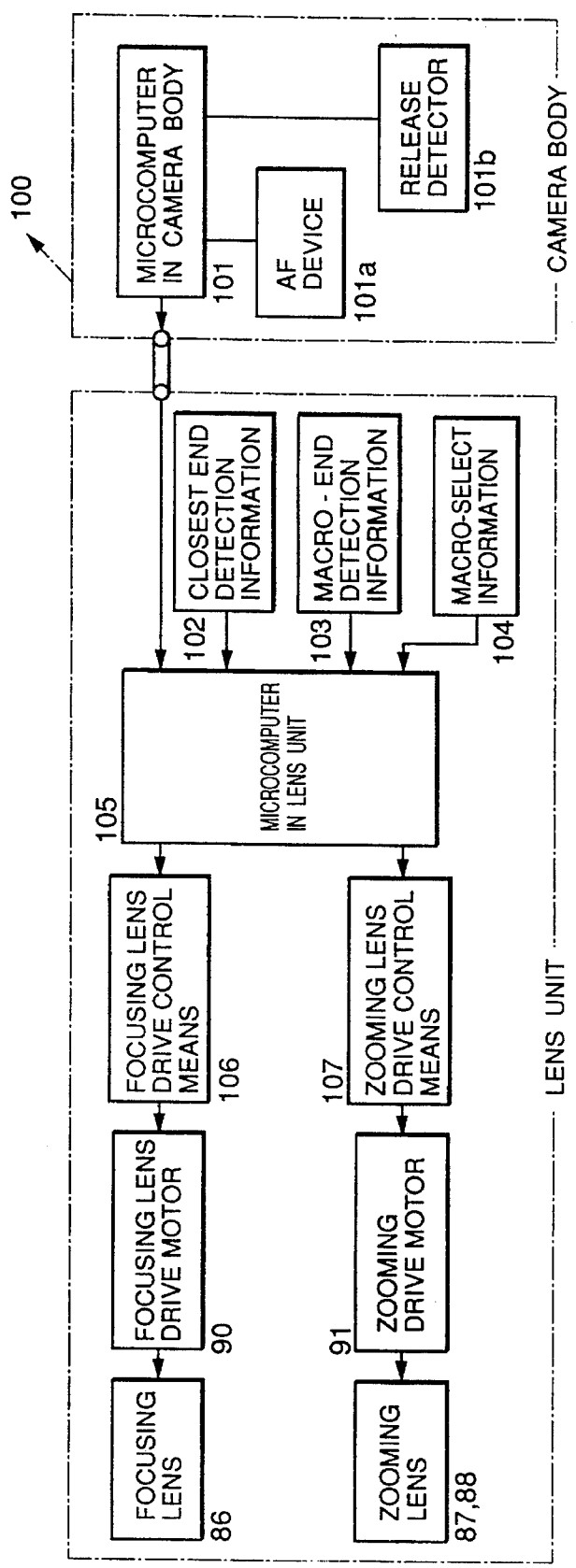
FIG. 10 is a block diagram illustrating an electrical system of the fourth embodiment of the present invention.

FIG. 10 is a block diagram illustrating an electrical system of the fourth embodiment of the present invention. AF information, which is an output from an AF apparatus 10a, is input to a microcomputer 105 in a camera body 100 through the electrical contact point 120. Thereupon, closest end detection information from the focus absolute position detecting means 93 of FIG. 8, macro end detection information from the position detecting means 94, and macro select information 104 from the macro select SW 96a are also input to the microcomputer 105 in the lens unit. Reference numeral 101b denotes a release operation detecting circuit for detecting the state in which a release operation member is being operated.

The microcomputer 105 in the lens unit computes the driving amount of the focusing lens 86 and the zooming lenses 87 and 88 on the basis of the input information, and outputs the driving amount to focusing lens drive control means 106 and zooming lens drive control means 107. The focusing lens drive control means 106 controls the focusing motor 90 to drive the focusing lens 86, and the zooming lens drive control means 107 controls the zooming motor 91 to drive the zooming lenses 87 and 88.

Figure 11:
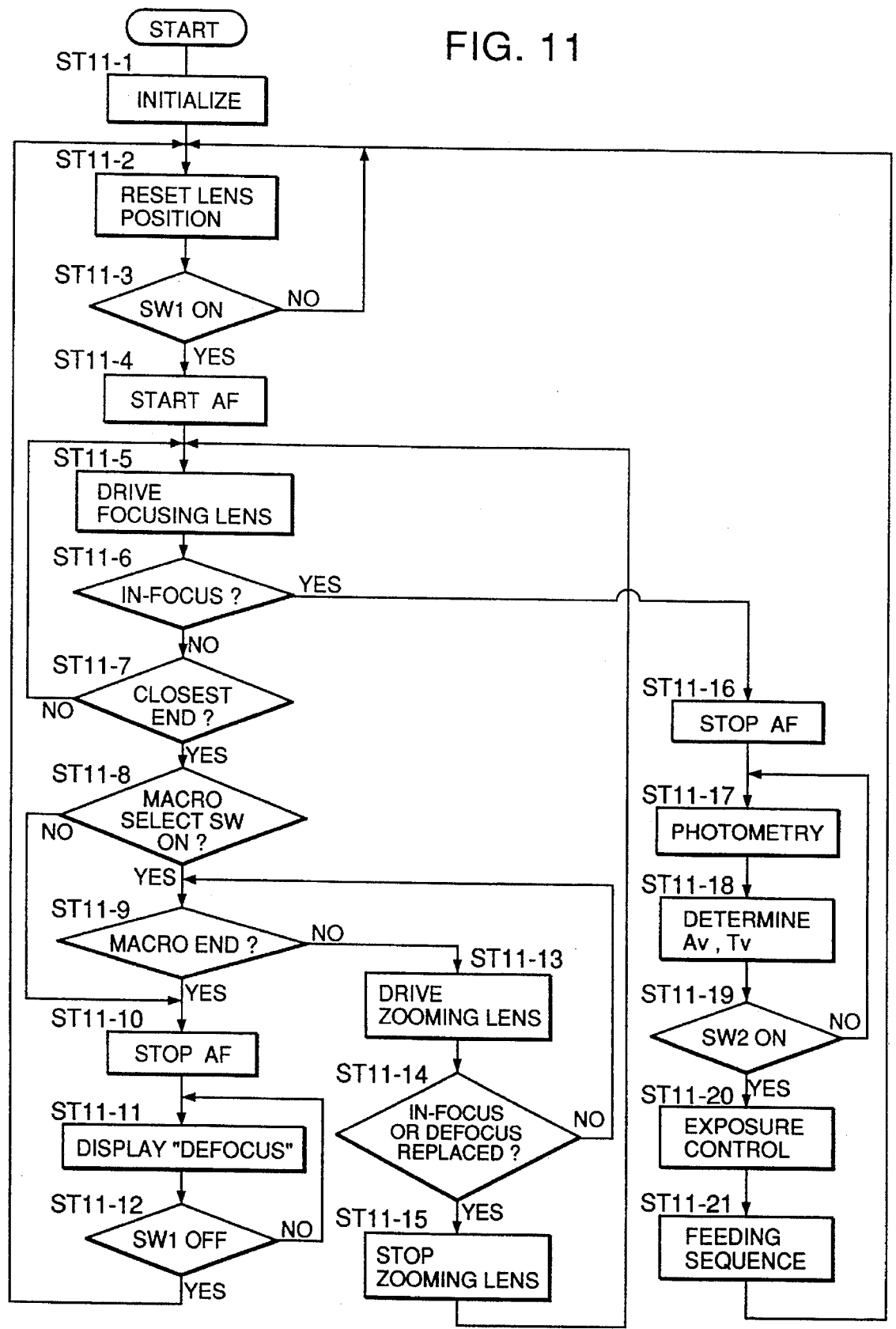
FIG. 11 is a flowchart showing the operation of the fourth embodiment of the present invention.

The operation of the fourth embodiment will be explained with reference to the flowchart in FIG. 11.

When the power supply is turned on, the operation starts, and the microcomputer 105 in a camera body 100 is cleared (initialized). Then, communication with the camera body 100 and detection by detecting means such as switches are started. When it is detected by the position detecting means 94 of FIG. 8 that the zooming lenses 87 and 88 are present in the macro region, the zooming lenses 87 and 88 are reset to the normal region in step ST11-2. Then, in step ST11-3, it is checked by the release operation detecting circuit 101b of the camera body 100 whether the release SW1 is on or off (it becomes on when it is pushed to the first stroke). If the release SW1 is on, the process proceeds to step ST11-4. If, however, the release SW1 is not pressed thereto, i.e., it is off, the process returns to step ST11-2.

In step ST11-4, AF is started, and an amount of defocus of the object and the direction thereof are detected. This detection is repeated until an AF stop signal is output. Then, in step ST11-5, the focusing lens 86 is driven on the basis of the detected defocus amount and the detected direction thereof.

In step ST11-6, a determination is made whether an in-focus state has been reached. If an in-focus state has been reached, the process proceeds to step ST11-16; if not, the process proceeds to step ST11-7 where it is determined by the position detecting means 93 whether the focusing lens 86 is present at the closest end. When it is determined that the direction of the defocus is the direction of the closest distance and the defocus is present at the closest end, the process proceeds to step ST11-8; when it is not, the process returns to step ST11-5 where the focusing lens 86 is further driven.

In step ST11-8, it is determined whether the macro mode has been selected from the macro select SW 96a of FIG. 8. When the macro mode has been selected, the process proceeds to step ST11-9; when not, the process proceeds to step ST11-10.

In step ST11-9, it is determined whether the zooming lenses 87 and 88 are at the macro end of the macro region by means of the zoom position detecting means 94. When the zooming lenses 87 and 88 are at the macro end, the process proceeds to step ST11-10; when not, the process proceeds to step ST11-13.

In step ST11-10, an AF stop signal is output, causing AF to stop. Next, AF is made inoperable, and "INOPERABLE AF" is displayed on the unillustrated display section in the camera body. In step ST11-12, it is determined whether the release SW1 is off. When the release SW1 is still on, the process proceeds to step ST11-11; when it is off, the process returns to step ST11-2.

In step ST11-13, the zooming lens is moved to the macro region. Next, in step ST11-14, it is determined whether the direction of the in-focus or defocus indicates the direction of infinity. When the direction of the in-focus or defocus indicates the direction of infinity, the process proceeds to step ST11-15; when it does not yet indicate the direction of infinity, the process proceeds to step ST11-9. Then, in step ST11-15, the driving of the zooming lens is stopped, and the process returns to step ST11-5. In step ST11-16, an AF stop signal is output, causing AF to stop. Then, in step ST11-17, the brightness of the object is photometered.

In step ST11-18, the aperture value Av and the shutter speed Tv are determined on the basis of the photometered value. If the release SW2 of the camera body 100 is on (it becomes on when it is pushed to the second stroke), the process proceeds to step ST11-20. If the release SW2 has not been pushed thereto (the SW2 is off), the process returns to step ST11-17. Then, in step ST11-20, exposure is controlled on the basis of the aperture value Av and the shutter speed Tv. Next, the process proceeds to the feeding sequence in step ST11-21 where one frame of the film is wound up, and the process returns to step ST11-2.

According to the above-described embodiments, since the zoom range is designated manually or automatically, auto-zooming in a constant-magnification mode is made possible even with a high-magnification zoom lens without the risk that camera shake or an extreme view angle will occur. Furthermore, since a zooming driving member is driven during a macro photographing time, AF can be performed in the entire region, including the macro photographing region.

Since AF is performed by driving the focusing lens again after the zoom lens is moved to the proximity of the in-focus during focusing in a macro photographing region, coarse adjustment is performed by a zooming lens and fine adjustment is performed by the focusing lens. Thus, coarse control, similar to that performed in a conventional autozoom, is required for controlling a zooming lens. As a result, no fine encoders for zooming are required, and precise AF is made possible.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. An optical apparatus, comprising:

a first lens capable of zooming;

designating means for designating a zooming range;

a storing circuit for storing the zooming range designated by said designating means;

additional designating means for designating a focal length value; and driving control means for receiving the designated focal length value from said additional designating means and for automatically driving said first lens to the designated focal length value, if the designated focal length value is within the zooming range stored in said storing circuit.

2. An optical apparatus according to claim 1, wherein said designating means comprises means for inputting information and for designating the zooming range based on the input information.

3. An optical apparatus according to claim 1, wherein said designating means comprises means for receiving photometric information regarding an object and for designating the zooming range on the basis of the photometric information regarding the object.

4. An optical apparatus according to claim 1, wherein said designating means comprises means for receiving strobe illuminating angle range information and for designating the zooming range on the basis of the received information.

5. An optical apparatus according to claim 1, wherein said apparatus further comprises a detecting device that detects the position of said first lens, and said driving control means comprises means for detecting a zooming state of said first lens by using information from the detecting device.

6. An optical apparatus according to claim 5, wherein said driving control means further comprises a motor to drive said first lens along the optical axis of said apparatus.

7. An optical apparatus, comprising:

a first lens capable of zooming;

measuring means for measuring the distance to an object;

a determination circuit for determining focal length information for said first lens to achieve a designated image magnification on the basis of the distance information obtained by said measuring means;

designating means for designating a zooming range;

a storing circuit for storing the zooming range designated by said designating means; and driving control means for moving said first lens within the zooming range stored in said storing circuit, said driving control means comprising means for preventing said first lens from leaving the stored zooming range even when the focal length information is outside of the stored zooming range.

8. An optical apparatus according to claim 7, wherein said designating means comprises means for inputting information and for designating the zooming range based on the input information.

9. An optical apparatus according to claim 7, wherein said designating means comprises means for receiving photometric information regarding an object and for designating the zooming range on the basis of the photometric information regarding the object.

10. An optical apparatus according to claim 7, wherein said designating means comprises means for receiving strobe illuminating angle range information and for designating the zooming range on the basis of the received information.

11. An optical apparatus according to claim 7, wherein said apparatus further comprises a detecting device that detects the position of said first lens, and said driving control means comprises means for detecting a zooming state of said first lens by using information from the detecting device.

12. An optical apparatus according to claim 11, wherein said driving control means further comprises a motor to drive said first lens along the optical axis of said apparatus.

13. An optical apparatus, comprising:

a lens capable of zooming;

driving control means for performing a zoom operation of said lens;

operation means for performing at least one other operation of said apparatus;

designating means for automatically designating a zooming range on the basis of specific information from said operation means regarding at least one other operation of said apparatus; and a storing circuit for storing the zooming range designated by said designating means, wherein said driving control means drives said lens within the range stored in said storing circuit.

14. An optical apparatus according to claim 13, wherein said designating means comprises means for receiving photometric information from said operation means regarding an object and for designating a zooming range on the basis of the photometric information regarding the object.

15. An optical apparatus according to claim 13, wherein said designating means comprises means for receiving strobe illuminating angle range information from said operation means and for designating a zooming range on the basis of the received information.

16. An apparatus according to claim 13, wherein said driving control means comprises means for receiving information from a detecting device for detecting the position of said first lens and means for detecting the zooming state of the first lens by using the received information.

17. An optical apparatus according to claim 13, wherein said driving control means comprises means for using a motor as a driving source and means for performing zooming by moving said first lens along an optical axis.

* * * * *

UNITED STATES PATENT AND TRADEMARK OFFICE
CERTIFICATE OF CORRECTION

PATENT NO. : 5,537,174
DATED : July 16, 1996
INVENTOR(S) : MASANORI ISHIKAWA

It is certified that error appears in the above-indentified patent and that said Letters Patent is hereby corrected as shown below: On title page,

At [56] Reference Cited

Line 5, Takumaru et al." should read --Tokumaru et al.--.

Column 1

Line 19, "use" should read --using--.

Column 5

Line 49, "ST7-4" should read --ST7-4.--.

Signed and Sealed this

Fifth Day of November, 1996

Attest:

BRUCE LEHMAN

*Attesting Officer*   *Commissioner of Patents and Trademarks*